United States Patent [19]

Albright et al.

[11] 4,124,084
[45] Nov. 7, 1978

[54] PARKING BRAKE FOR A SKID STEER LOADER VEHICLE

[75] Inventors: Larry E. Albright, Gwinner; James J. Bauer, Lisbon, both of N. Dak.

[73] Assignee: Clark Equipment Company, Buchanan, Mich.

[21] Appl. No.: 745,905

[22] Filed: Nov. 29, 1976

Related U.S. Application Data

[62] Division of Ser. No. 654,257, Feb. 2, 1976, abandoned.

[51] Int. Cl.² ............................................. B62D 11/04
[52] U.S. Cl. .................................. 180/6.48; 188/72.7
[58] Field of Search ...................... 180/6.48; 188/72.1, 188/72.3, 72.8, 72.7, 106 P, 72.4; 74/470

[56] References Cited

U.S. PATENT DOCUMENTS

| | | | |
|---|---|---|---|
| 1,708,440 | 9/1929 | Carhart | 74/470 X |
| 1,764,923 | 6/1930 | Wilson | 74/470 X |
| 2,815,104 | 12/1957 | Du Shane | 188/72.7 X |
| 3,155,195 | 11/1964 | Braweman | 188/72.8 X |
| 3,204,713 | 9/1965 | Shanahan et al. | 180/6.48 X |
| 3,500,968 | 3/1970 | Bosler | 188/72.7 |
| 3,675,741 | 7/1972 | Frei | 188/72.8 X |
| 3,877,550 | 4/1975 | Hahn | 188/106 P |
| 3,980,347 | 9/1976 | Griesenbrock | 188/72.4 X |

*Primary Examiner*—John A. Pekar
*Attorney, Agent, or Firm*—Ernst H. Ruf

[57] ABSTRACT

A parking brake assembly mountable on the chain sprocket drive of a skid steer vehicle. Independent hydrostatic transmissions for a skid steer vehicle have a driving motor for each set of wheels of the vehicle. Drive shafts for each motor extend into the transmission case and carry at their inner ends rotatable brake discs splined thereon and fastened in place so as to be integrally rotatable with the output shafts of the hydraulic motors. Brake members carried on a brake assembly mounted on the transmission case engage the brake discs to limit the output of the drive motors and stop the vehicle.

5 Claims, 4 Drawing Figures

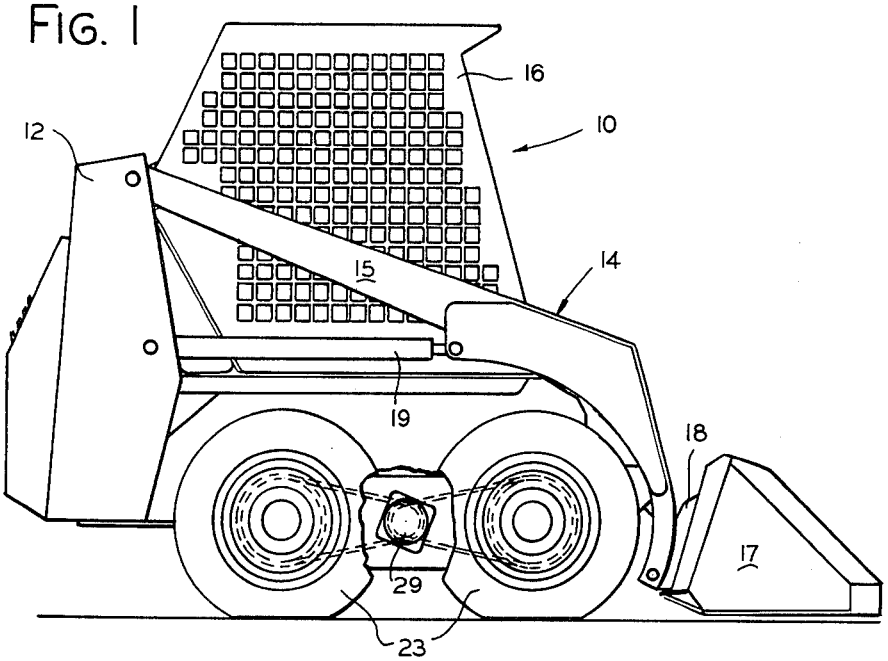
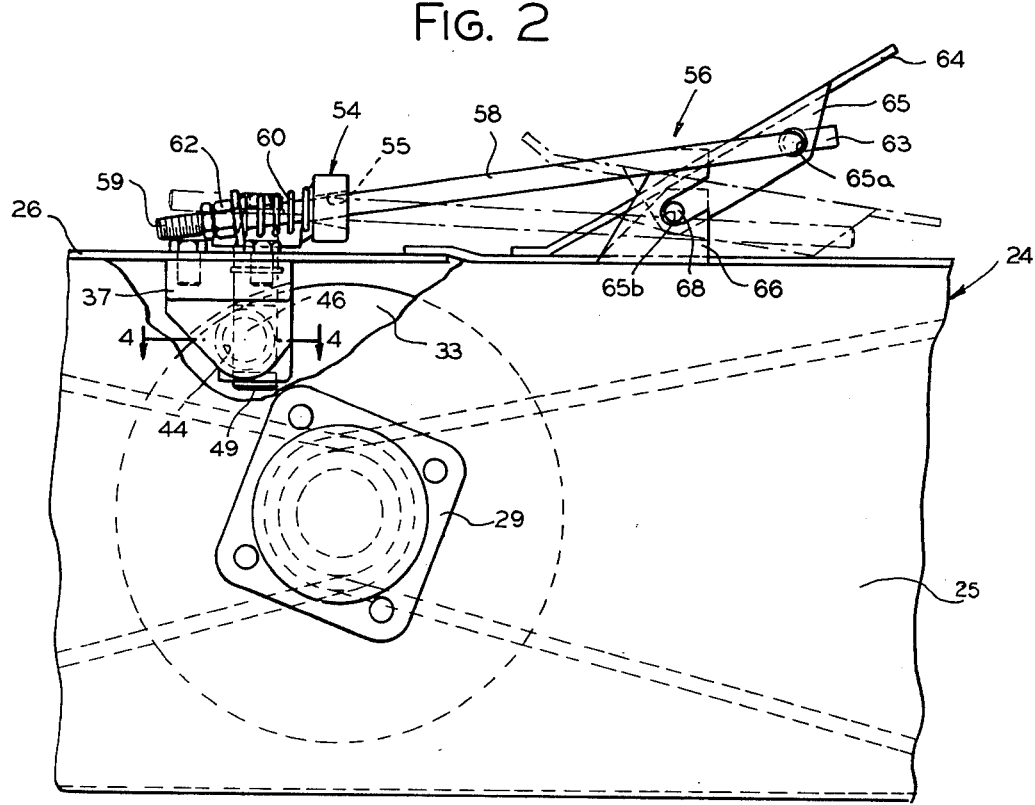

PARKING BRAKE FOR A SKID STEER LOADER VEHICLE

This is a division of application Ser. No. 654,257, filed Feb. 2, 1976, now abandoned.

BACKGROUND OF THE INVENTION

The invention pertains to a brake assembly, and more particularly to a parking brake assembly for a skid steer loader vehicle. Skid steer loaders are propelled and maneuvered by driving the wheels on one side of the vehicle at a different speed and/or in an opposite direction from those on the other side so as to achieve a turning motion. The "steering" is controlled by the operator using a pair of levers, one on each side of the operator's feet, which may be moved independently in a fore and aft direction to cause the wheels on that side of the machine to rotate at a speed and at a direction corresponding to the position of the lever. For example, both levers may be moved forward in either a forward or rearward manner causing the loader to move straight forward or back up at variable speeds depending on the position of the levers. Or, the driver may move the levers simultaneously but to a greater degree on one side than the other thus causing the loader to execute a turn. Or, by pushing one lever in one direction and pulling the other in the opposite direction the loader is turned on its axis or spun around virtually in its own tracks.

Hydraulic drive means include independent transmissions for each set of wheels on opposite sides of the vehicle. The levers provided in the operator's compartment control the inputs to each transmission independently. The transmissions comprise independent hydraulic motors carried on a transmission case, each having an output shaft extending into the case carrying drive sprockets thereon which by means of independent chain drives are connected to respective wheel sprockets for each set of wheels. Thus the output shafts of the hydraulic motors control input to the wheels and consequently speed and direction of the vehicle. Stopping of the vehicle is normally achieved by placing the control levers in a neutral position to stop fluid flow to the hydraulic motors. With the control levers in the neutral position, fluid flow from the hydrostatic pumps driving the hydraulic motors associated with the transmission is halted thus effectively stopping the hydraulic motors and rotation of the output shaft.

Little effort has been made previously to provide positive braking means for skid steer vehicles. Typically, a skid steer vehicle is stopped by returning both control levers to a neutral position. However, such braking means makes no provision for the inadvertent movement of one or more of the control levers which could cause the vehicle to operate accidentally and out of the control of the operator. Further, in a hydrostatic drive means such as typically used in a skid steer vehicle, it is difficult to achieve a null output position and a skid steer vehicle left unattended with the engine running and the control levers in the neutral position tends to "creep" or inch forward. Accordingly, it would be desirable to provide positive braking means for such skid steer vehicle whereby the drive means of the vehicle could be positively locked against relative motion.

SUMMARY OF THE INVENTION

A parking brake assembly is provided for a skid steer vehicle having independent transmissions driving the wheels of the vehicle. A pair of axially aligned variable displacement pumps are driven by the output shaft of an engine mounted on the rear of the vehicle. Each pump is connected to its own hydraulic motor associated with the drive means for each set of wheels for the vehicle. The hydraulic motor is mounted on a transmission case containing separate chain and sprocket drives for each set of wheels. An output shaft of the hydraulic motor extends into the interior of the transmission case and carries thereon drive sprockets associated with the chain and sprocket drive for the set of wheels driven by that hydraulic motor. Splined to an inner end of each output shaft is a rotatable brake disc which is fastened thereto to be integrally rotatable with the output shaft of the hydraulic motor.

The brake assembly further includes a mounting bracket bolted to the lower surface of the top wall of the transmission case, the mounting bracket having laterally spaced slots therein which permit the free rotation of the brake discs through the slots. Also provided in the mounting bracket is a longitudinal bore having its axis transverse to the slots provided in the bracket, the cross section of the bore being disposed within a cone of rotation defined by the brake discs mounted on the drive sprockets. Carried in the bore and concentric therewith are a plurality of brake members so disposed that a compressible member lies on opposite sides of each of the two brake discs. At one end of the bore is provided a compression shaft having a cam surface rotatable into engagement with a brake member at one end of the bore. The compression shaft extends outwardly of the mounting bracket to be engaged at an upper portion thereof with an actuating lever operable by a pedal assembly connected thereto and mounted on an upper surface of the transmission case. Actuation of the pedal assembly moves the actuating lever to rotate the cam surface of the compression shaft into engagement with the brake member at the end of the bore to engage the brake members with the brake discs carried on the drive shafts of the vehicle. Thus, positive braking means are provided for the skid steer loader.

These and other advantages will become more apparent when the following detailed description of the invention is considered with the drawings, which are described below as follows:

DESCRIPTION OF THE DRAWINGS

FIG. 1 is a side elevational view of a skid steer tractor having portions thereof removed to reveal part of the drive train of the vehicle;

FIG. 2 is an enlarged detail view of that portion of the drive train shown in FIG. 1 and including the brake assembly of the present invention;

DESCRIPTION OF THE PREFERRED EMBODIMENT

Figure 3:
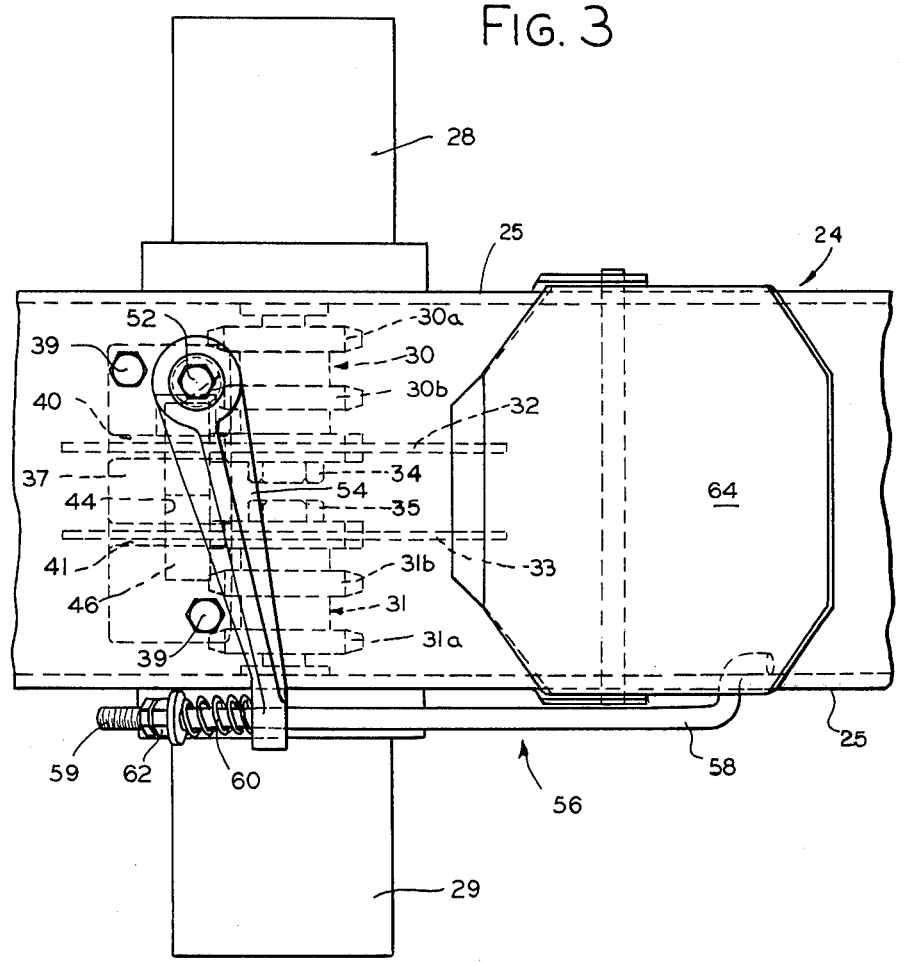
FIG. 3 is a top plan view of the detail view shown in FIG. 2.

FIG. 1 is a side elevational view of a skid steer tractor vehicle 10 having a pair of uprights 12 at the rear, a boom assembly 14 comprising a pair of boom arms 15 pivoted to the uprights 12 and extending forwardly along a protective enclosure 16 surrounding an operator's compartment for the vehicle 10. The boom arms 15 carry at a lower end an attachment, such as bucket 17, mounted on an implement mounting means 18 pivoted on the lower ends of the boom arms 15. A pair of hydraulic cylinders 19 mounted between the uprights 12 and the boom arms 15 may be extended or retracted for raising or lowering the boom arms 15. Hydraulic means provided between the arms 15 and the attachment carrier 18 may be operated to pivot the implement mounting means 18 to tilt the bucket 17. An engine located at the rear of the vehicle 10 drives wheels 23 on opposite sides of the vehicle in either forward or reverse directions, at the same or different speeds, as controlled by steering levers provided in the operator's compartment which independently control separate transmissions. Thus, the wheels 23 are driven independently to steer or maneuver in a manner already known as skid steering.

In accordance with the present invention the drive means for the vehicle include a transmission case 24 carrying on opposite side walls 25 independent hydraulic motors 28, 29 driven by a pair of axial aligned variable displacement pumps (not shown), said pumps in turn being driven by the engine of the vehicle. Carried on the inner ends of the hydrostatic motors 28, 29 are respective drive shafts 30, 31 projecting into the interior of the case 24 at respective mid portions thereof and freely rotatable therein. Motors 28, 29 and drive shafts 30, 31 are mutually aligned on the transmission case 24. Drive sprockets 30a, 30b and 31a, 31b are provided on the drive shafts 30, 31. Splined to the inner ends of the drive shafts 30, 31 to be integrally rotatable therewith are respective brake discs 32, 33. The brake discs 32, 33 are splined to the drive shafts 30, 31 and secured against excessive axial outward movement by fasteners 34, 35.

A brake mounting member 37 of a brake assembly 36 is secured to the under side of a top wall 26 of the transmission case 24 by diagonally opposed fasteners 39. Laterally spaced slots 40 and 41 are provided in the mounting member 37, the mid plane of the slots 40, 41 coinciding with the mid plane of the brake discs 32, 33, the discs 32, 33 being freely rotatable therethrough. A bore 44 is provided in the mounting member 37, the bore 44 being transverse to the slots 40, 41 as well as respective planes of rotation for the brake discs 32, 33 and having its longitudinal axis generally parallel to the axis of rotation of the drive shafts 30, 31. Further, the bore 44 lies within the cone of rotation of the brake discs 32, 33 as shown in FIG. 2. A plurality of brake members 46 are disposed in the bore 44, the brake members 46 taking the form of thick circular discs or pucks 46 concentric with the bore 44. A puck 46 is disposed on each side of each brake disc 32, 33, with pucks or brake members 46 being capable of having a compressive force applied thereto.

Figure 4:
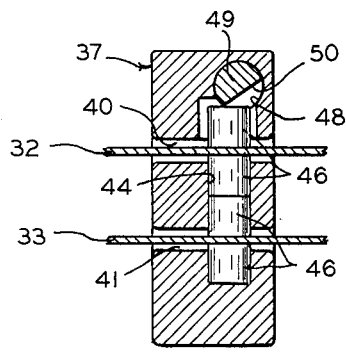
FIG. 4 is a sectional view taken generally along the line 4—4 of FIG. 2.

A vertical bore 48 is provided at the end of the bore 44 and partially intrudes therein as shown in FIG. 4. A compression shaft 49 having an upper cam surface 50 is disposed in the bore 48. The shaft 49 extends through an opening provided in the upper wall 26 of the case 24 to be secured by a fastener 52 to one end of an actuating lever 54 of the brake pedal assembly 56. The opposite end of the actuating lever 54 has an opening 55 therein which receives an operating link 58 of the brake pedal assembly 56. Carried on the link 58 and disposed between the actuating lever 54 and a lower end 59 of the link 58 is a compression spring 60. One end of the spring engages the lever 54 and the opposite end engages a fastening means 62 including a lock nut and washer combination. The lower end 59 of the link 58 is threaded to adjust compression forces in the spring 60. The link 58 terminates at its upper end in a bent portion 63 having a Z-shaped configuration as shown in FIG. 3. The end 63 is received in an upper opening 65a of a side flange 65 of a brake pedal 64. A support bracket 66 for the brake pedal 64 is mounted on the top wall 26 of the transmission case 24. Laterally spaced plates 67 of the bracket 66 carry a rod 68 mounted therebetween. The rod 68 receives the brake pedal 64 at a lower opening 65b in the flange 65. The parking brake is energized by stepping down on the brake pedal 64, thus rotating the pedal to the position shown in phantom in FIG. 2 and driving the actuating arm 54 forward to rotate the compression shaft 49 as shown in FIG. 4. When the compression shaft is rotated the cam surface 50 is brought into engagement with an upper one of the pucks 46 thus driving the group of pucks 46 into engagement with the brake discs 32, 33 to prevent rotation of the output shafts carrying the drive sprockets for the vehicle and thus providing positive braking means for the skid steer vehicle.

While one preferred embodiment of our invention has been described it will be understood that such description is for the purposes of illustration only and that various modifications and changes may be made without departing from the nature and scope of the invention as set forth in the appended claims.

We claim:

1. In a skid steer vehicle having first and second separate drive means operable to independently drive first and second sets of drive wheels mounted on opposite sides of the vehicle, including a pair of hydrostatic motors axially aligned for driving each set of wheels independently, each motor having an output shaft extending therefrom for engagement with its respective drive means, a brake mechanism comprising a pair of rotatable discs, each disc mounted on the respective output shaft of an associated hydrostatic motor for integral rotation therewith, a mounting bracket assembly mounted adjacent to the drive means of the vehicle and overlying the rotatable discs, engageable portions disposed in the mounting bracket assembly and movable independently thereof, and actuating means disposed adjacent to the engageable portions, whereby movement of the actuating means in a locking direction forces the engageable portions into contact with the rotatable discs of the brake mechanism, stopping the rotation of the discs and locking the drive means of the vehicle in fixed relation, said mounting bracket assembly having separable portions through which the discs freely rotate when the drive means is engaged and the portions engaging the discs comprise brake members capable of having a compressive force applied thereto, said brake members being carried on the mounting bracket and disposed on opposite sides of the rotatable discs and interposed therebetween for engagement therewith.

2. A brake mechanism as claimed in claim 1 wherein the actuating means includes a rotatable compression shaft mounted in said mounting bracket and having a cam surface which engages said brake members and moves said brake members into engagement with the rotatable discs so as to prevent rotation thereof.

3. A brake mechanism as claimed in claim 1 wherein said separable portions include slots therein through which said discs freely rotate when the drive means is engaged, a longitudinal bore transverse to said slots carries said brake members and a second bore, perpendicular to said longitudinal bore intrudes into an end portion of said longitudinal bore, said second bore receiving a rotatable compression shaft therein, said compression shaft having a cam surface thereon movable against said brake members in such a manner that rotation of said compression shaft pushes said brake members into engagement with said rotatable discs so as to prevent movement thereof.

4. A brake mechanism as claimed in claim 1 wherein the actuating means comprises an actuating lever having one end secured to a rotatable shaft bearing on the engageable portions of the brake mechanism, an opposite end secured to a movable link of a brake pedal assembly, the actuation of the brake pedal assembly causing the actuating lever to rotate the shaft to bring the engageable portions into contact with the rotatable discs thereby limiting movement thereof.

5. A brake mechanism as claimed in claim 4 wherein the brake pedal assembly includes an operating link secured at one end thereof to one end of the actuating lever and an opposite end of the operating link is secured to a rotatable brake pedal and means are provided at the first end portion of the operating link to adjust the amount of compressible force exerted by the brake pedal assembly.

* * * * *